United States Patent
Gupta et al.

(10) Patent No.: US 6,729,409 B1
(45) Date of Patent: May 4, 2004

(54) FOAMED NITROGEN IN LIQUID $CO_2$ FOR FRACTURING

(76) Inventors: D. V. Satyanarayana Gupta, 94 Edenstone View, N.W., Calgary, Alberta (CA), T3A 4T4; Ronald G. Pierce, 1521-14th Avenue S.W., Calgary, Alberta (CA), T3C 0W4; Cheryl L. Senger Elsbernd, 3640 Mt. Vernon La., Woodbury, MN (US) 55129

( * ) Notice: Subject to any disclaimer, the term of this patent is extended or adjusted under 35 U.S.C. 154(b) by 0 days.

(21) Appl. No.: 09/857,827

(22) PCT Filed: Dec. 10, 1999

(86) PCT No.: PCT/CA99/01180

§ 371 (c)(1),
(2), (4) Date: Oct. 5, 2001

(87) PCT Pub. No.: WO00/36272

PCT Pub. Date: Jun. 22, 2000

(30) Foreign Application Priority Data

Dec. 11, 1998 (CA) .............................................. 2255413

(51) Int. Cl.[7] ........................ E21B 43/26; E21B 43/267
(52) U.S. Cl. .................... 166/308.6; 166/309; 507/202; 507/205
(58) Field of Search ................................ 166/308, 309, 166/280, 271, 402, 403; 507/202, 205

(56) References Cited

U.S. PATENT DOCUMENTS

| | | | | |
|---|---|---|---|---|
| 4,267,887 A | | 5/1981 | Watanabe | 166/300 |
| 4,432,882 A | * | 2/1984 | Raynolds et al. | 507/202 |
| 4,440,653 A | * | 4/1984 | Briscoe et al. | 507/202 |
| 4,557,837 A | * | 12/1985 | Clark, III et al. | 252/8.55 |
| 4,609,477 A | * | 9/1986 | Crema | 507/202 |
| 4,627,495 A | | 12/1986 | Harris et al. | 166/280 |
| 4,741,844 A | | 5/1988 | Posey, Jr. | 252/8.553 |
| 4,836,281 A | * | 6/1989 | Robin et al. | 166/272 |
| 4,921,635 A | * | 5/1990 | Enick | 516/99 |
| 5,069,283 A | | 12/1991 | Mack | 166/308 |
| 5,424,285 A | | 6/1995 | Stacy et al. | 507/202 |
| 5,515,920 A | * | 5/1996 | Luk et al. | 166/280 |
| 5,883,053 A | | 3/1999 | Tudor | 507/102 |
| 6,225,262 B1 | * | 5/2001 | Irwin et al. | 507/203 |
| 6,235,701 B1 | * | 5/2001 | Senger Elsbernd | 510/412 |

* cited by examiner

*Primary Examiner*—George Suchfield
(74) *Attorney, Agent, or Firm*—Kent S. Kokko

(57) ABSTRACT

A method for fracturing subterranean formations surrounding oil and gas wells using a fracturing fluid consisting of a foam constituted by a liquid phase and a gaseous phase. The liquid phase has a foam forming substance dissolved therein. The foam forming substance is preferably a surfactant such as a non-ionic hydrofluoroether surfactant. The liquid phase is preferably $CO_2$ and the gaseous phase $N_2$.

12 Claims, No Drawings

FOAMED NITROGEN IN LIQUID CO₂ FOR FRACTURING

FIELD OF THE INVENTION

The present invention relates to the field of fracturing subterranean formations around oil and gas wells. In particular, the present invention relates to an improvement in fracturing using liquid $CO_2$ as a fracturing medium.

BACKGROUND OF THE INVENTION

Hydraulic fracturing has been widely used for stimulating the production of crude oil and natural gas from wells completed in reservoirs of low permeability. Methods employed normally require the injection of a fracturing fluid containing suspended propping agents into a well at a rate sufficient to open a fracture in the exposed formation. Continued pumping of fluid into the well at a high rate extends the fracture and leads to the build up of a bed of propping agent particles between the fracture walls. These particles prevent complete closure of the fracture as the fluid subsequently leaks off into the adjacent formations and results in a permeable channel extending from the well bore into the formations. The conductivity of this channel depends upon the fracture dimensions, the size of the propping agent particles, the particle spacing and the confining pressures.

The fluids used in hydraulic fracturing operations must have fluid loss values sufficiently low to permit build up and maintenance of the required pressures at reasonable injection rates. This normally requires that such fluids either have adequate viscosities or other fluid loss control properties which will reduce leak-off from the fracture into the pores of the formation.

Fracturing of low permeability reservoirs has always presented the problem of fluid compatibility with the formation core and formation fluids, particularly in gas wells. For example, many formations contain clays which swell when contacted by aqueous fluids causing restricted permeability, and it is not uncommon to see reduced flow through has well cores tested with various oils.

Another problem encountered in fracturing operations is the difficulty of total recovery of the fracturing fluid. Fluids left in the reservoir rock as immobile residual fluids impede the flow of reservoir gas or fluids to the extent that the benefit of fracturing is decreased or eliminated. Attempting the removal of the fracturing fluid may require a large amount of energy and time, sometimes not completely recovering all the products due to formation characteristics. Consequently the reduction or elimination of the problem of fluid recovery and residue removal is highly desired.

In attempting to overcome fluid loss problems, gelled fluids prepared with water, diesel, methyl alcohol, solvents and similar low viscosity liquids have been useful. Such fluids have apparent viscosities high enough to support the proppant materials without settling and also high enough to prevent excessive leak-off during injection. The gelling agents also promote laminar flow under conditions where turbulent flow would otherwise take place and hence in some cases, the pressure losses due to fluid friction may be lower than those obtained with low viscosity-base fluids containing no additives. Certain water-soluble, polyacrylamides, oil soluble poly-isobutylene and other polymers which have little effect on viscosity when used in low concentration can be added to the ungelled fluid to achieve good friction reduction.

In attempting to overcome the problem of fluid compatibility when aqueous fracturing fluids are used, chemical additives have been used such as salt or chemicals for pH control. Salts such as NaCl, KCl or $CaCl_2$ have been widely used in aqueous systems to reduce potential damage when fracturing water sensitive formations. Where hydrocarbons are used, light products such as yelled condensate have seen a wide decree of success, but are restricted in use due to the nature of certain low permeability reservoirs.

Low density vases such as $CO_2$ or $N_2$ have been used in attempting to overcome the problem of removing the fracturing (load) liquid. The low density cases are added to the load fluid at a calculated ratio which promotes back flow subsequent to fracturing. This back flow of load fluids is usually due to reservoir pressure alone without mechanical aid from the surface because of the reduction of hydrostatic head caused by gasifying the liquid.

Moreover, low density liquefied gases have themselves been used as fracturing fluids. Reference is made to Canadian Patents 687,938 and 745,453 to Peterson who discloses a method and apparatus for fracturing underground earth formations using liquid $CO_2$. Peterson recognized the advantages of liquid $CO_2$ as a means to avoid time consuming and expensive procedures involved in the recovery of more conventional fracturing fluids. Peterson however does not disclose the use of entrained proppants in conjunction with liquid $CO_2$. The combination of a liquid $CO_2$ fracturing fluid and propping agents has been described by Bullen in Canadian Patent 932,655 wherein there is described a method of entraining proppants in a gelled fluid, typically a gelled methanol, which is mixed with liquid carbon dioxide and injected into low permeability formations. The liquid carbon dioxide is allowed to volatilize and bleed off and the residual liquid, primarily methyl alcohol, is in part dissolved by formation hydrocarbons and allowed to return to the surface as vapor. The balance, however, is recovered as a liquid using known recovery techniques. It has, however, been demonstrated that the need to use a galled carrier fluid has resulted in the negation of some of the fluid recovery advantages attendant upon the sole use of liquefied gas fracturing fluids.

Subsequent disclosures have been concerned primarily with the development of more advantageous gelled fluids to entrain proppants for subsequent or simultaneous blending with the liquefied carbon dioxide fracturing fluid. Reference is made to Canadian Patents 1,000,483 (reissued as Canadian Patent 1,034,363), 1,043,091, 1,197,977, 1,241,826 and 1,242,389 in this regard. Each of these patents teaches the nature and composition of gelled or ungelled carrier fluids, typically methanol or water based, which, when blended with liquid $CO_2$ produce a two-phase liquid system which allegedly is useful in attempting to overcome the problems of leak-off and fluid compatibility with formation fluids while at the same time beings capable of transporting increased concentrations of proppant material into the fracture zones.

Treatments have also been designed utilizing, combinations of fluids with nitrogen or carbon dioxide and even binary foams where nitrogen and liquid carbon dioxide are combined into an aqueous or water-based fracturing fluid. Reference is made in this regard to U.S. Pat. No. 5,069,283 issued on Dec. 3, 1991 to the Western Company of North America. The addition of nitrogen and/or liquid carbon dioxide provides a non-combustible gas that aids in the recovery of the treatment fluids. These gasified fluids also reduce the amount of potentially damaging aqueous fluid pumped into the formation. Despite this, this method nevertheless requires the incorporation of a thickening agent into an aqueous fluid to provide sufficient viscosity to entrain adequate proppants and to prevent leak-off. Although these gasified fluids reduce the amount of potentially damaging gelled and/or cross-linked load fluid pumped into the formation, the risk of contamination by significant residual liquid fractions remain high.

From the foregoing, it will be readily appreciated that the use of liquid $CO_2$ as a fracturing agent is known. It is further known to use other liquids having propping agents entrained therein for blending with the liquefied gas fracturing fluid. The propping agents are subsequently deposited in the liquid or foam-formed fractures for the purpose of maintaining flow passages upon rebound of the fracture zone. It is further known that proppant materials can be introduced into a liquid carbon dioxide system if a chemically gelled or cross-linked liquid, usually alcohol or water-based, is mixed with the $CO_2$ to impart sufficient viscosity to the mixture to support proppant particles and to control leak-off in the fracture. So-called "binary" systems incorporating additional quantities of nitrogen in a thickened aqueous substrate are known. All of these practices lead to residual chemicals and gel precipitates left in the fracture proppant pack that can impair production of the well.

In Canadian Patent 1,134,258, it has been recognized that proppant materials can be introduced directly into a liquid carbon dioxide stream using little or no other viscosifying liquid components while still transporting significant quantities (up to 800 kg/m³ and more in some situations) of proppant material into the fracture zones. This has been achieved by pressurizing and cooling the proppants to substantially the storage pressure and temperature of the liquefied $CO_2$ prior to blending of the trio for injection down the well bore.

This method, based as it is on the injection of pure or virtually pure CON, enjoys the obvious advantage of lessening the impact of the treatment fluid on the formation. A gas as mentioned in this application describes any substance that at atmospheric conditions exists in the vapour phase of that substance. Liquid $CO_2$, and gases such as nitrogen, air, exhaust gas, natural as and inert gases, are all relatively inert to the formation being stimulated and therefore no damage is done to the formation due to injection since it is believed that $CO_2$ and the other aforementioned gases do not change the relative permeability of the reservoir rock. The liquid $CO_2$ fracturing medium converts to a gaseous state after being subjected to formation temperatures and pressures to eliminate associated fluid pore blockage in the formation and to promote complete fluid recovery on flow back. Moreover, no residual chemicals or gel precipitates are left behind to impair fracture conductivity.

Moreover, as demonstrated in U.S. Pat. No. 5,558,160, significant advantages can be obtained from combining gases, in particular $N_2$, with liquid $CO_2$. In particular, liquid $CO_2/N_2$ treatment pressures at equivalent volumetric rates.

The applicant has now discovered that significant viscosity increases in a liquid $CO_2$ fracturing fluid system can be obtained by introducing a foamer or surfactant into the liquid $CO_2$, and then bubbling $N_2$ into the $CO_2$. This results in a viscous foam with $N_{2(g)}$ as the internal phase, $CO_{2(l)}$ as the external phase, and the foamer or surfactant as the interface between the phases.

SUMMARY OF THE INVENTION

The object of the present invention is to provide a method of fracturing subterranean formations surrounding oil and gas wells comprising injecting into said wells a liquid $CO_2$ fracturing fluid With higher viscosity than currently available.

A further object of the present invention is to provide a method of fracturing subterranean formations surrounding oil and gas wells using a fracturing fluid comprising foam of $N_{2(g)}$ in $CO_{2(l)}$ in which a foam forming substance has been dissolved.

A further object of the present invention is to provide a method of fracturing subterranean formations surrounding oil and gas wells using a liquid $CO_2$ fracturing fluid capable of creating a wide fracture.

A further object of the present invention is to provide method of fracturing subterranean formations surrounding oil and gas wells using a liquid $CO_2$ fracturing fluid capable of transporting a large proppant load.

A further object of the present invention is to provide a method of fracturing subterranean formations surrounding oil and gas wells using a liquid $CO_2$ fracturing fluid capable of controlled leak off into a formation.

In a broad aspect, then, the present invention relates to a method of fracturing subterranean formations surrounding oil and gas wells using a foam constituted by a liquid phase and a gaseous phase, said liquid phase hog a non-functional, nonionic fluorochemical stabilizer dissolved therein.

DETAILED DESCRIPTION

In furtherance of the present invention, a foam forming substance that is soluble in liquid or supercritical $CO_2$ is added to $CO_2$ in modest volume (about 1–30, preferably 2–20 more preferably about 10 L/m³). Nitrogen is then bubbled into the liquid, to create a foam useful in the method of the present invention. The proportion of gaseous phase in the liquefied $CO_2$ is from about 1 to 75 weight %.

The foam forming substance useful in the method of the present invention is a fluorochemical stabilizer comprising a nonionic, fluorinated hydrocarbon that may be linear, branched, or cyclic, and optionally may contain one or more additional catenary heteroatoms, such as nitrogen or oxygen. The stabilize may be selected from the group consisting of fully- and partially-fluorinated alkanes, amines, ethers, and aromatic compounds. Preferably, the fluorochemical stabilizer is non-functional, i.e. lacking functional groups that are polymerizable, reactive toward acids, bases, oxidizing agents, reducing agents or nucleophiles. Preferably, the number of fluorine atoms exceeds the number of hydrogen atoms in the fluorochemical stabilizer. To be non-flammable, the relationship between the number of fluorine, hydrogen, and carbon atoms can preferably be related in that the number of fluorine atoms is equal to or exceeds the sum of the number of number of hydrogen atoms and carbon-carbon bonds:

F atoms ≥ (# H atoms + # C—C bonds).

One class of compounds useful as fluorochemical stabilizers comprises perfluorocarbons in which all carbon-bound hydrogen is replaced by fluorine atoms. Such compounds are known to be inert and exhibit high thermal stability. Such perfluorinated compounds may include perfluoroalkanes, perfluoroamines and, perfluoroethers, which may be linear or branched, and cyclic or acyclic. Examples of perfluorinated compounds include perfluoroalkanes having the general formula $C_nF_{2n+2}$, perfluoroethers and polyethers having the general formula $C_nF_{2n+2}O_m$ and perfluoroamines having the general formula $C_nF_{2n+3}N$, where n is an integer of 3 to 20 and m is 1 to 5.

Useful perfluorinated liquids typically contain from 3 to 20 carbon atoms and may optionally contain one or more catenary heteroatoms, such as divalent oxygen or trivalent nitrogen atoms. The term "perfluorinated liquid" as used herein includes organic compounds in which all (or essentially all) of the hydrogen atoms are replaced with fluorine atoms. Representative perfluorinated liquids include cyclic and non-cyclic perfluoroalkanes, perfluoroamines, perfluoroethers, perfluorocycloamines, and any mixtures thereof. Specific representative perfluorinated liquids include the following: perfluoropentane, perfluorohexane, perfluoroheptane, perfluorooctane, perfluoromethylcyclohexane, perfluorotributyl amine, perfluorotriamyl amine, perfluoro-N-methylmorpholine, perfluoro-N-ethylmorpholine, perfluoroisopropyl morpholine, perfluoro-N-methyl pyrrolidine, perfluoro-1,2-bis(trifluoromethyl)hexafluorocyclobutane, perfluoro-2-butyltetrahydrofuran, perfluorotriethylamine, perfluorodibutyl ether, and mixtures of these and other perfluorinated liquids.

Commercially available perfluorinated liquids that can be used in this invention include: FLUORINERT FC-43™-Electronic Fluid, FLUORINERT FC-72™ Electronic Fluid, FLUORINERT FC-77™ Electronic Fluid, FLUORINERT FC-48™ Electronic Fluid, FLUORINERT FC-87™ Electronic Fluid, Performance Fluid PF-5060™, Performance Fluid PF-5070™, and Performance Fluid PF-5052™. Some of these liquids are described in FLUORINERT™ Electronic Fluids, product bulletin 98-0211-6086(212)NPI, issued February, 1991, available from 3M Co., St. Paul. Minn. Other commercially available perfluorinated liquids that are considered useful in the present invention include perfluorinated liquids sold as GALDEN™ LS fluids available from Montedison Inc., Italy, KRYTOX™ fluids available from DuPont and FLUTEC™ PP fluids available from BNFL Fluorochemicals Ltd.

Perfluorinated compounds are known and can be made by techniques such as direct fluorination, electrochemical fluorination, addition polymerization of fluorine-containing monomers and the oxidative polymerization of fluorine containing monomers. See, for example, *Chemistry of Organic Fluorine Compounds II*, M. Hudlicky and A. Pavlath, Eds., ACS Monograph 187, American Chemical Society, Washington, D.C., 1995, pp. 95–120.

It is preferred that the fluorochemical stabilizer contains aliphatic hydrogen atoms. Perfluorinated compounds, since they lack chlorine atoms, are not ozone-depleting agents, but these compounds may exhibit a global warming potential (GWP) due to their long atmospheric lifetimes. It is preferred that the fluorochemical stabilizer contains at least one aliphatic hydrogen atom in the molecule. These compounds generally are very thermally and chemically stable, yet are much more environmentally acceptable in that they degrade in the atmosphere and thus have a low global warming potential, in addition to a zero ozone depletion potential.

Partially fluorinated liquids, containing one or more aliphatic or aromatic hydrogen atoms, may be employed in the fluid compositions of the invention. Such liquids, like the above perfluorinated counterparts, typically contain from 3 to 20 carbon atoms and may optionally contain one or more catenary heteroatoms, such as divalent oxygen or trivalent nitrogen atoms. Useful partially fluorinated liquids include cyclic and non-cyclic fluorinated alkanes, amines, ethers, cycloamines, and any, mixture or mixtures thereof. Preferably, the number of fluorine atoms exceeds the number of hydrogen atoms and more preferably the number of fluorine atoms is equal to or exceeds the sum of the number of combined hydrogen atoms and carbon-carbon bonds. Although not preferred, due to environmental concerns, the partially fluorinated liquids optionally may contain one or more chlorine atoms provided that where such chlorine atoms are present there are at least two hydrogen atoms on the geminal or adjacent carbon atom(s).

One class of partially fluorinated liquids useful as fluorochemical stabilizers are hydrofluorocarbons: i.e. compounds having only carbon, hydrogen and fluorine, and optionally catenary divalent oxygen and/or trivalent nitrogen. Such compounds are nonionic, may be linear or branched, cyclic or acyclic. Such compounds are of the formula $C_nF_mH_{2n+2-m}$, where n is from about 3 to 20 inclusive, m is at least one, and where one or more non-adjacent —$CF_2$— groups may be replaced with catenary oxygen or trivalent nitrogen atoms. Preferably the number of fluorine atoms is equal to or greater than the number of hydrogen atoms, and more preferably the number of fluorine atoms is equal to or exceeds the sum of the combined number of hydrogen atoms and carbon-carbon bonds of fluorine atoms.

Another useful class of partially fluorinated liquids includes fluoroalkyl-substituted aromatic compounds such as hexafluoroxylene.

A preferred class of hydrofluorocarbon liquids particularly useful to form the stable fluid composition of the invention comprises fluorinated ethers of the general formula:

$$(R_1-O)_n-R_2 \qquad (I)$$

where, in reference to Formula I, n is a number from 1 to 3 inclusive and $R_1$ and $R_2$ are the same or are different from one another and are selected from the group consisting of alkyl, aryl, and alkylaryl groups and their derivatives. At least one of $R_1$ and $R_2$ contains at least one fluorine atom, and at least one of $R_1$ and $R_2$ contains at least one hydrogen atom, $R_1$ and $R_2$ may also be linear, branched, cyclic or acyclic and optionally, one or both of $R_1$ and $R_2$ may contain one or more catenary heteroatoms, such as trivalent nitrogen or divalent oxygen. Preferably the number of fluorine atoms is equal to or greater than the number of hydrogen atoms, and more preferably the number of fluorine atoms is equal to or exceeds the sum of the number of combined number of hydrogen atoms and carbon-carbon bonds. Although not preferred, due to environmental concerns, $R_1$ or $R_2$ or both of them optionally may contain one or more chlorine atoms provided that where such chlorine atoms are present there are at least two hydrogen atoms on the $R_1$ or $R_2$ group on which they are present.

More preferably, the fluid compositions of the present invention are prepared with fluorinated ethers of the formula:

$$R_f-O-R \qquad (II)$$

where, in reference to Formula II above, $R_f$ and R are as defined for $R_1$ and $R_2$ of Formula I, except that $R_f$ contains at least one fluorine atom, and R contains no fluorine atoms. More preferably, R is an acyclic branched or straight chain alkyl group, such as methyl, ethyl, n-propyl, iso-propyl, n-butyl, i-butyl, or t-butyl, and $R_f$ is preferably a fluorinated derivative of a cyclic or acyclic, branched or straight chain alkyl group having from 3 to about 14 carbon atoms, such as n-$C_4F_9$—, i-$C_4F_9$—, i-$C_3F_7$, (n-$C_3F_7$)CF— or cyclo-$C_6F_{11}$—. $R_f$ may optionally contain one or more catenary heteroatoms, such as trivalent nitrogen or divalent oxygen atoms.

In a preferred embodiment, $R_1$ and $R_2$, or $R_f$ and R, are chosen so that the compound has at least three carbon atoms, and the total number of hydrogen atoms in the compound is at most equal to the number of fluorine atoms. In the most preferred embodiment. $R_1$ and $R_2$ or $R_f$ and R are chosen so that the compound has at least three carbon atoms, and more preferably number of fluorine atoms is equal to or exceeds the sum of the number of combined hydrogen atoms and carbon-carbon bonds.

Representative hydrofluoroether compounds described by Formulas I and II include the following:

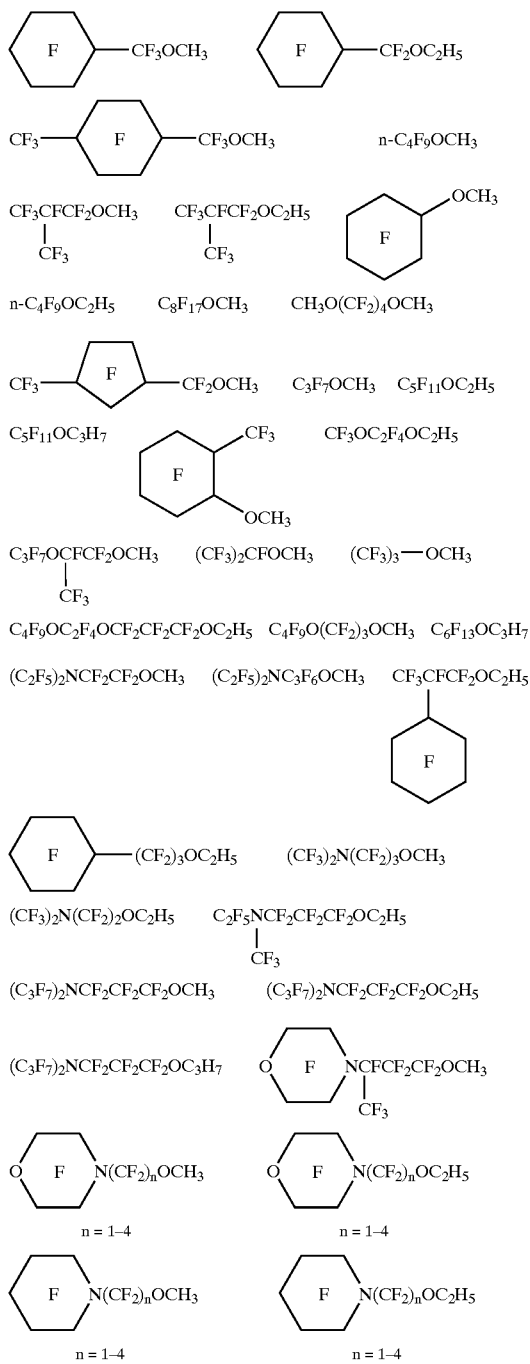

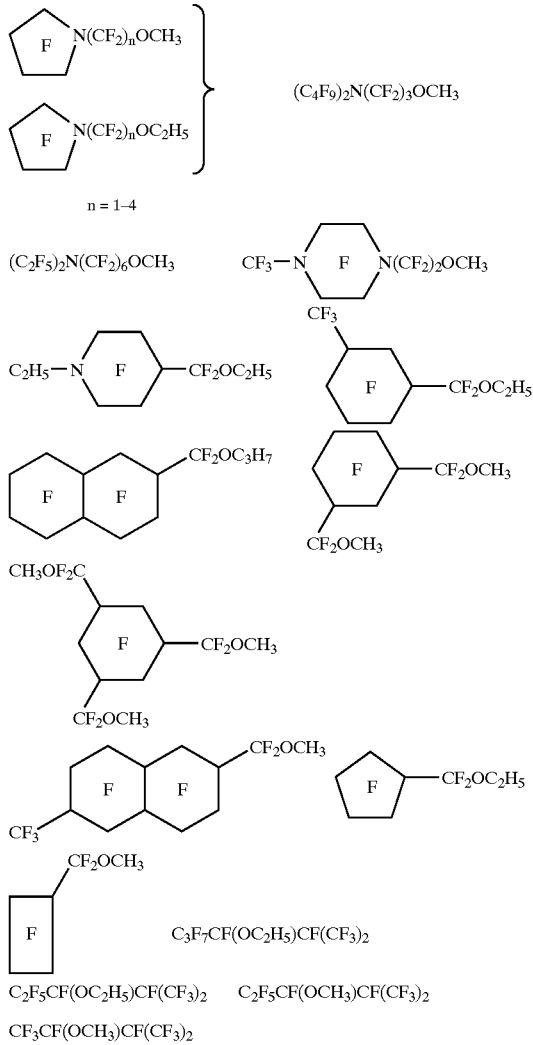

wherein cyclic structures designated with an interior "F" are perfluorinated.

Preferred segregated hydrofluoroethers include $C_3F_7OCH_3$, $(CF_3)_2CFOCH_3$, $C_4F_9OCH_3$, $(CF_3)_2CFCF_2OCH_3$, $(CF_3)_2CFCF_2OC_2H_5$, $(CF_3)_3COCH_3$, $CH_3O(CF_2)_4OCH_3$, and $CH_3O(CF_2)_6OCH_3$, $C_3F_7OC_2H_5$, $C_4F_9OC_2H_5$, c-$C_7F_{13}OCH_3$, c-$C_7F_{13}OC_2H_5$, $C_7F_{15}OCH_3$, $C_7F_{15}OC_2H_5$, $C_{10}F_{21}OCH_3$, and $C_{10}F_{21}OC_2H_5$. By "segregated" it is meant that hydrogen atom(s) and fluorine atom (s) are not found on adjacent carbon atoms. Blends of one or more fluorinated ethers are also considered useful in practice of the invention.

A number of synthetic routes to hydrofluoroethers are known. These methods may be broadly divided into two groups; methods of fluorinating an ether compound, and methods where the ether linkage is formed within a compound by reaction with a fluorine-containing precursor. The former methods include: (1) direct fluorination of an ether compound; and (2) electrochemical fluorination of an ether compound. The latter methods include: (3) the addition reaction of an alcohol to a fluorinated olefin; (4) alkylation of a partially fluorinated alcohol; and (5) non-catalytic alkylation of a fluorinated carbonyl compound with a suitable alkylating agent. Japanese Patent No. JP 6-293686 provides a partial summary description of these varied methods.

The fluorinated ethers (alkoxy-substituted perfluorocompounds) suitable for use in the method of the invention can be prepared by alkylation of perfluorinated alkoxides prepared by the reaction of the corresponding perfluorinated acyl fluoride or perfluorinated ketone with an anhydrous alkali metal fluoride (e.a., potassium fluoride or cesium fluoride) or anhydrous silver fluoride in an anhydrous polar, aprotic solvent. (See, e.g., the preparative methods described in French Patent Publication No. 2,287,432, German Patent Publication No. 1,294,949, and U.S. Pat. No. 5,750,797 (Flynn et al.). Alternatively, a fluorinated tertiary alcohol can be allowed to react with a base, e.g., potassium hydroxide or sodium hydride, to produce a perfluorinated tertiary alkoxide which can then be alkylated by reaction with alkylating agent.

Suitable alkylating agents for use in the preparation include dialkyl sulfates (e.g., dimethyl sulfate), alkyl halides (e.g., methyl iodide), alkyl p-toluenesulfonates (e.g., ethyl p-toluenesulfonate), alkyl perfluoroalkanesulfonates (e.g., methyl perfluoromethanesulfonate), and the like. Suitable polar, aprotic solvents include acyclic ethers such as diethyl ether, ethylene glycol dimethyl ether, and diethylene glycol dimethyl ether; carboxylic acid esters such as methyl formate, ethyl formate, methyl acetate, diethyl carbonate, propylene carbonate, and ethylene carbonate; alkyl nitriles such as acetonitrile; alkyl amides such as N,N-dimethylformamide. N,N-dimethylformamide, and N-methylpyrrolidone; alkyl sulfoxides such as dimethyl sulfoxide; alkyl sulfones such as dimethylsulfone, tetramethylene sulfone, and other sulfolanes; oxazolidones such as N-methyl-2-oxazolidone; and mixtures thereof.

As yet another alternative, the fluorinated ethers may be prepared by reacting a fluorinated carbonyl compound, such as a ketone or acid fluoride, with an alkylating agent in the presence of a Lewis acid catalyst as described in U.S. Ser. No. 09/042,819 filed Mar. 17, 1998 (Lamanna et al.).

Other useful hydrofluoroethers are the omega-hydrofluoroalkyl ethers described in U.S. Pat. No. 5,658,962 (Moore et al.), which can be described by the general structure shown in Formula III:

  (Formula III)

wherein:

X is either F or H;

$R_f'$ is a divalent perfluorinated organic radical having from 1 to about 12 carbon atoms;

$R_f''$ is a divalent perfluorinated organic radical having from 1 to about 6 carbon atoms;

R'' is a divalent organic radical having from 1 to 6 carbon atoms, and preferably, R'' is perfluorinated; and y is an integer from 0 to 4.

Representative compounds described by Formula III which are suitable for use in the processes of the invention include the following compounds:

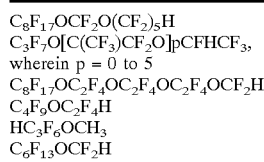
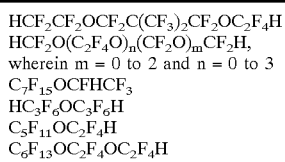

$C_8F_{17}OCF_2O(CF_2)_5H$
$C_3F_7O[C(CF_3)CF_2O]pCFHCF_3$, wherein p = 0 to 5
$C_8F_{17}OC_2F_4OC_2F_4OC_2F_4OCF_2H$
$C_4F_9OC_2F_4H$
$HC_3F_6OCH_3$
$C_6F_{13}OCF_2H$
$HCF_2CF_2OCF_2C(CF_3)_2CF_2OC_2F_4H$
$HCF_2O(C_2F_4O)_n(CF_2O)_mCF_2H$, wherein m = 0 to 2 and n = 0 to 3
$C_7F_{15}OCFHCF_3$
$HC_3F_6OC_3F_6H$
$C_5F_{11}OC_2F_4H$
$C_6F_{13}OC_2F_4OC_2F_4H$
$c$-$C_6F_{11}CF_2OCF_2H$
$C_4F_9OCF_2C(CF_3)_2CF_2H$
$C_3F_7OCH_2F$ and The omega-hydrofluoroalkyl ethers described by Formula III can be prepared by decarboxylation of the corresponding precursor fluoroalkyl ether carboxylic acids and salts thereof or, preferably, the saponifiable alkyl esters thereof, as described in U.S. Pat. No. 5,658,962.

Alternatively, the omega-hydrofluoroalkyl ethers can be prepared by reduction of the corresponding omega-chlorofluoroalkyl ethers (for example, those omega-chlorofluoroalkyl ethers described in U.S. Pat. No. 5,785,950 and U.S. Pat. No. 5,403,575 (Flynn et al.), which is also described in U.S. Pat. No. 5,658,962.

The fluorochemical stabilizer should be soluble in the liquid or supercritical $CO_2$ from at least 0.01 weight percent to completely miscible. Preferably the fluorochemical stabilizer should be soluble in the liquid or supercritical $CO_2$ from at least 0.05 weight percent. The solubility of the stabilizer in $CO_2$ may be determined by charging a pressure vessel having a sight glass with liquid or supercritical $CO_2$, and adding a known amount of stabilizer and known amount of carbon dioxide. Generally, the fluorinated stabilizer of the present invention produce clear solutions (or microemulsions) and no interface between separate phases is observed. Less soluble materials will form a hazy solution or two separate phases will develop, and an interface between phases may be observed.

The fluorochemical stabilizer is generally, used at concentrations from about 0.01 volume percent up to about 10 volume percent. Preferably, the stabilizer is used at concentrations from about 0.02 volume percent up to about 5 volume percent. For most applications due to cost considerations, the stabilizers are used in the minimum amounts necessary to produce a stable fracturing fluid.

The preferred foam forming substances are hydrofluoroethers, such as 3M HFE-7100 methoxy-nonafluorobutane, or 3M HFE-7200 ethoxy-nonafluorobutane.

3M HFE-7100 ($C_4F_9OCH_3$) consists of two inseparable isomers with essentially identical properties. These are $(CF_3)_2CFCF_2OCH_3$ and $CF_3CF_2CF_2CF_2OCH_3$.

3M HFE-7200 ($C_4F_9OC_2H_5$) consists of two inseparable isomers with essentially identical properties. These are $(CF_3)_2CFCF_2OC_2H_5$ and $CF_3CF_2CF_2CF_2OC_2H_5$.

Each of these hydrofluoroethers is soluble in $CO_{2(l)}$, but neither has heretofore been used in a well fracturing fluid as a foam forming substance in $CO_{2(l)}$.

Efficacy of these hydrofluoroethers as foamers may be demonstrated by the following examples:

EXAMPLE 1

Ethoxy-nonofluorobutane is added to a pressure cell containing $CO_{2(l)}$ at 2° C., 800 psi (5520 kPa), at a rate of 20 L/M³ $CO_2$. A clear, one phase liquid results. Additional $CO_{2(l)}$ is added, with no change. Pressure is increased to 1300 psi (8960 kPa) with no change. $N_{2(g)}$ bubbled at 1740 psi (12000 kPa) into the $CO_2$ solution, resulting in two phases, with a fuzzy interface. The cell is then shaken for five seconds, resulting in a single foam phase. Additional $N_2$ will mix into the foam. If the foam is permitted to rise in temperature, a minimal gas phase is noted.

The conclusion from Example 1 is that ethoxy-nonofluorobutane is soluble in $CO_{2(l)}$ under the conditions stated, and functions as an effective foamer for $N_2$.

EXAMPLE 2

Following the procedure of Example 1, 10 L/M$^2$ methoxy nonafluorobutane were added to $CO_{2(l)}$ at −3° C., 915 psi (6310 kPa). A clear one phase liquid resulted. Addition of $N_2$ at 1475 psi (10200 kPa) and agitation resulted in a stable foam, which remained stable upon chilling to −21° C., and pressure adjustment to 1090 psi (7520 kPa).

It was concluded that methoxy nonafluorobutane is soluble in $CO_{2(l)}$ under the conditions stated and functions as an effective foamer for $N_2$.

EXAMPLE 3

5 L/M$^3$ methoxy fluorobutane was added at 0° C. 700 psi (4830 kPa) to $CO_{2(l)}$, resulting in a clear one phase liquid. Pressure was gradually reduced to 300 psi (2070 kPa), and the solution chilled to −20° C. No change in the single phase liquid was noted. $N_{2(g)}$ (70%) was bubbled through the liquid rapidly, raising the pressure to 1100 psi (7580 kPa), and causing a cloudy foam. Pressure and temperature increases caused the foam to change to a clear one phase liquid.

The conclusion of Example 3 is that at 5 L/M$^3$ a satisfactory foam was created with methoxy fluorobutane.

EXAMPLE 4

In Example 4, the same process and Example 3 was carried out, but with 5 L/M$^3$ ethoxy fluorobutane. The same results were obtained, and the same conclusion reached.

In additional tests, the procedures of Examples 3 and 4 were followed, with 2 L/M$^3$ of each foamer, and 1 L/M$^3$ was the minimum quantity of foamer required to give satisfactory results.

It was found, moreover, in all satisfactory foams, that a minimum volume of 52% $N_2$ was required, A minimum $CO_2$ content of 5% is required. Thus $CO_2/N_2$ volumetric ratios at temperature and pressure (Mitchell Quality) are in the range of from 48:52 to 5:95.

Utilizing the $N_2$ foamed $CO_2$ of the present invention it has been found that fairly high viscosity foams, with high proppant loading characteristics are created.

The embodiments of the invention in which an exclusive property or privilege is claimed are defined as follows:

1. A method of fracturing subterranean formations surrounding oil and gas wells comprising injecting into said wells a foam constituted by a liquid phase and a gaseous phase, said liquid phase having a non-functional, nonionic fluorochemical stabilizer dissolved therein;

wherein said liquid phase is constituted by a liquefied gas, and said fluorochemical stabilizer is soluble therein.

2. The method as claimed in claim 1, wherein said liquefied gas is $CO_2$.

3. The method as claimed in claim 2 wherein said fluorochemical stabilizer comprises a nonionic, linear or branched, cyclic or acyclic fluorinated hydrocarbon that may contain one or more catenary nitrogen or oxygen heteroatoms.

4. The method as claimed in claim 2 wherein said fluorochemical stabilizer is selected from the group of linear or branched, cyclic or acyclic perfluoroalkanes, perfluoroethers, perfluoropolyethers am perfluoroamines.

5. The method as claimed in claim 2 wherein said fluorochemical stabilizer comprises fluorinated ethers of the general formula: $R_f$—O—R where $R_f$ and R are selected from the group consisting of substituted and unsubstituted alkyl, aryl, and alkylaryl groups, and wherein $R_f$ is perfluorinated, and R contains no fluorine atoms.

6. The method as claimed in claim 5, wherein said fluorinated ether is elected from the group consisting of methoxy-nonafluorobutane and ethoxy-nonafluorobutane.

7. The method as claimed in claim 2, wherein said gaseous phase is constituted by $N_2$.

8. The method as claimed in claim 7, wherein the ratio of $CO_2:N_2$ is in the range of from 48:52 to 5:95.

9. The method as claimed in claim 7, wherein the volume of foam forming substance dissolved in said liquid phase comprises in the range of about 0.1% to 30% of said liquid phase.

10. The method as claimed in claim 4 wherein the proportion of gaseous phase to inert gas in said liquefied $CO_2$ is from about 1 to 75 weight %.

11. The method as claimed in claim 4 wherein the concentration of fluorochemical stabilizer in said fluid composition is from about 0.01 to 10 volume percent.

12. The method of claim 1 wherein said foam further comprises a proppant.

* * * * *

UNITED STATES PATENT AND TRADEMARK OFFICE
CERTIFICATE OF CORRECTION

PATENT NO. : 6,729,409 B1
APPLICATION NO. : 09/857827
DATED : May 4, 2004
INVENTOR(S) : D. V. Satyanarayana Gupta It is certified that error appears in the above-identified patent and that said Letters Patent is hereby corrected as shown below:

Column 1
Line 41, delete "has" and insert -- gas --, therefor.

Column 2
Line 7, delete "yelled" and insert -- gelled --, therefor.
Line 8, delete "decree" and insert -- degree --, therefor.
Line 10, delete "vases" and insert -- gases --, therefor.
Line 38, delete "galled" and insert -- gelled --, therefor.
Line 54, delete "beings" and insert -- being --, therefor.
Line 57, after "utilizing" delete ",".

Column 3
Line 34, delete "liquefied" and insert -- liquified --, therefor.
Line 34, delete "trio" and insert -- two --, therefor.
Line 36, delete "CON" and insert -- $CO_2$ --, therefor.
Line 41, delete "as" and insert -- gas --, therefor.

Column 4
Line 2, delete "With" and insert -- with --, therefor.
Lines 24-25, delete "hog a non-functional, nonionic fluorochemical stabilizer" and insert -- having a foam forming substance --, therefor.
Line 32, After "2-20" insert -- , --.
Line 37, after "is a" insert -- surfactant and preferably a --.
Line 41, delete "stabilize" and insert -- stabilizer --, therefor.
Line 55, delete "# F atoms $\geq$ (# H atoms +# C-C bonds)" and insert
-- = F atoms $\geq$ ( = H atoms - = C-C bonds) --, therefor.

Column 5
Line 25, delete "FC-48$^{TM}$" and insert -- FC-84$^{TM}$ --, therefor.
Line 64, after "any" delete ",".

Column 6
Line 37, after "atom" delete "," and insert -- . --, therefor.

UNITED STATES PATENT AND TRADEMARK OFFICE
CERTIFICATE OF CORRECTION

PATENT NO.         : 6,729,409 B1
APPLICATION NO. : 09/857827
DATED                  : May 4, 2004
INVENTOR(S)       : D. V. Satyanarayana Gupta It is certified that error appears in the above-identified patent and that said Letters Patent is hereby corrected as shown below:

Column 7
Line 16, delete

" 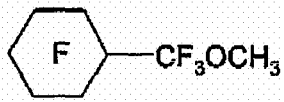 "

and insert therefore:

-- 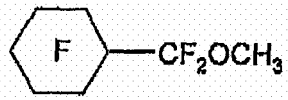 --

Line 17, delete " 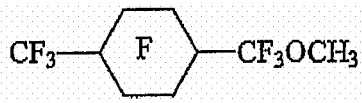 "

and insert -- 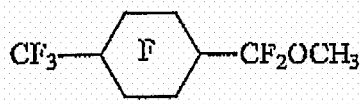 --, therefor.

Line 39, delete "$C_4F_9OC_2F_4OCF_2CF_2\mathbf{CF_2}OC_2H_5$" and insert -- $C_4F_9OC_2F_4OCF_2CF_2OC_2H_5$ --, therefor.

Column 8
Line 15, delete " 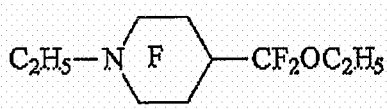 "

and insert -- 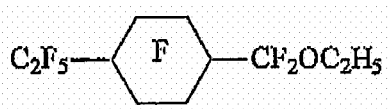 --, therefor.

UNITED STATES PATENT AND TRADEMARK OFFICE
CERTIFICATE OF CORRECTION

PATENT NO.        : 6,729,409 B1
APPLICATION NO.   : 09/857827
DATED             : May 4, 2004
INVENTOR(S)       : D. V. Satyanarayana Gupta It is certified that error appears in the above-identified patent and that said Letters Patent is hereby corrected as shown below:

Column 9
Line 6, delete "e.a." and insert -- e.g. --, therefor.
Line 19, delete "ethyl" and insert -- methyl --, therefor.
Line 28, after "dimethylformamide" delete "." and insert -- , --, therefor.
Line 28, delete "N,N-dimethylformamide" and insert -- N,N-diethylformamide --, therefor.

Column 10
Line 31, after "generally" delete ",".
Line 39, delete "hydrofluoroethers" and insert -- hydrofluorethers --, therefor.
Line 51, delete "hydrofluoroethers" and insert -- hydrofluorethers --, therefor.

Column 11
Line 40, after "required" delete "," and insert -- . --, therefor.

Signed and Sealed this

Twenty-eighth Day of November, 2006

JON W. DUDAS
*Director of the United States Patent and Trademark Office*